J. H. WILSON.
FISH TRAP.
APPLICATION FILED AUG. 29, 1908.
925,972.
Patented June 22, 1909.
2 SHEETS—SHEET 2.
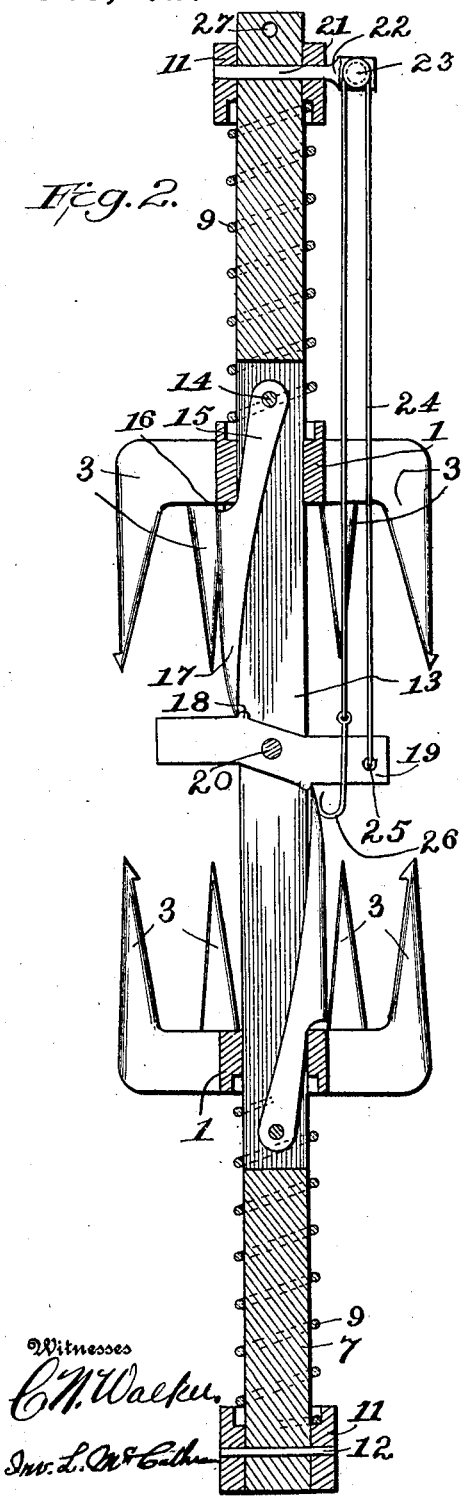
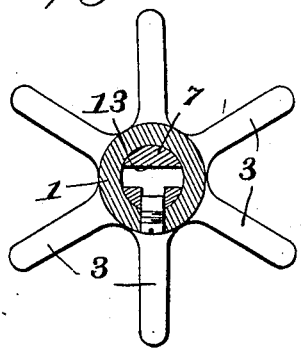
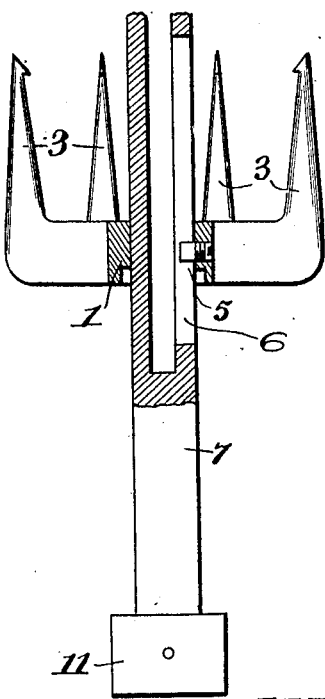
Inventor
John H. Wilson.

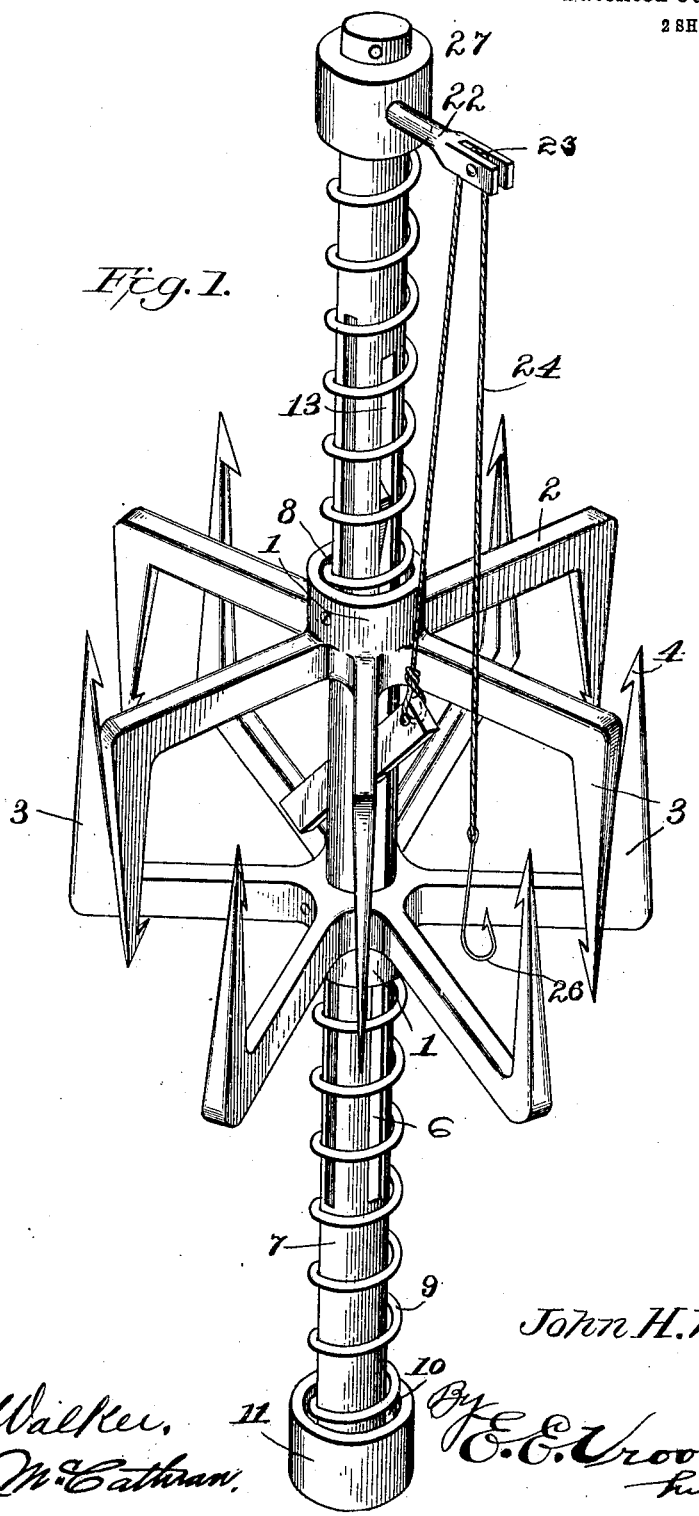

UNITED STATES PATENT OFFICE.

JOHN H. WILSON, OF CARMI, ILLINOIS.

FISH-TRAP.

No. 925,972.  Specification of Letters Patent.  Patented June 22, 1909.

Application filed August 29, 1908. Serial No. 450,848.

*To all whom it may concern:*

Be it known that I, JOHN H. WILSON, a citizen of the United States, residing at Carmi, in the county of White and State of Illinois, have invented certain new and useful Improvements in Fish-Traps, of which the following is a specification, reference being had therein to the accompanying drawing.

My invention relates to fish traps and the object thereof is to provide a device of this character which is simple and effective in operation and which will be positively actuated to catch a fish when the trap is set and the fish attempts to take the bait.

To the accomplishment of the recited object and others coördinate therewith, the preferred embodiment of my invention resides in that construction and arrangement of parts hereinafter described, illustrated in the accompanying drawings, and embraced within the scope of the appended claims.

In said drawings:—Figure I is a perspective view of the device embodying my invention, and Fig. II is a side elevation thereof partly shown in section. Fig. III is a transverse sectional view of the upper collar portion of one of the jaws, and Fig. IV is a fragmentary elevation of one terminal of the device.

Similar numerals of reference designate corresponding parts throughout the several views.

My invention contemplates the employment of a pair of oppositely disposed coacting jaws comprising a central collar portion (1) and a plurality of integrally formed laterally extending, right angularly shaped arms (2), the vertical portion (3) of said arms tapering or presenting a gradual diminution of thickness toward their distal ends, at which point they are provided with hooked portions (4). The collar portion of the arms carries a screw or lug (5) which is adapted to engage the longitudinally extending slot (6) of the shaft (7), the jaw, as an entirety, having the arms thereof so arranged that they will be interposed between the corresponding oppositely disposed jaw. Furthermore, the outer portion of each collar, is provided contiguous the shaft (7) with an annular recess (8), in which is adapted to be seated one terminal of the coil spring (9), the other terminal of the spring having a like bearing in the recess (10) on the underneath side of the sleeves (11), which are secured to the extremital portion of the shaft in any suitable manner, such for example as the pin (12). Arranged medially and extending longitudinally of the shaft (7) to points equidistant from the ends thereof is a slot (13) proximate the terminals of which are pivotally mounted, as at 14, trippers (15) provided with shoulders (16) centrally thereof and a pointed or tapering extremity (17), the respective portions being designed to engage the underneath of the collar (1) and of the diagonally disposed projections (18) of the trigger (19) which is pivotally mounted within and medially of the slot (13), at (20). Projecting through one of the sleeves (11), preferably the topmost, is a shank portion (21) of the laterally extending bracket or support (22) the outer terminal of which is bifurcated so as to receive the pulley (23) over which the cord (24) passes with one of its lower ends attached to the trigger (19), as at 25, the other end having secured and suspended therefrom an ordinary type of fish hook (26).

To set the trap, the jaws are moved away from each other along the shaft (7) against the action of the coil spring (9) until they reach a point where the collar portions thereof can be readily engaged by the shoulder portion (16) of the trippers (15), this relatively locked position of the jaws and trippers being maintained by the engagement of the lugs (18) with the inner distal ends of the portion (17) of said trippers. Assuming that the hook (26) has been baited, a suitable connection is secured at the upper end of the shaft (7), at 27, such for example as a cord or fish line, and the complete device lowered into the water, whereupon the user may secure the other end of the string or cord to any convenient place leaving the trap to perform its function. As the fish proceeds to nibble the bait, which is fastened to hook (26), the cord (24) is subjected to a slight pull and thus the other end of the cord which is connected to the trigger (19) raises or oscillates the latter and disengages the lugs (18) and the distal ends of the trippers (15), which gravitate inwardly and allow the jaws to simultaneously and uninterruptedly be forced toward each other because of the stress of the springs (9), the hook terminals (4) of said jaws impinging against the head or body portion of the fish in such a manner as to preclude any possibility of escapement.

It should be understood that in its broader aspect my invention comprehends the employment not only of the various means described, but of equivalent means for performing the recited functions. For example, my trap while being described as a fish trap essentially, is equally as well adapted to other small animals.

While the arrangement shown is thought, at the present time, to be preferable, it is desired to reserve the right to effect such modifications and variations thereof as may come fairly within the scope of the appended claims.

Having thus described my invention, what is claimed, is:—

1. In an animal trap, the combination with a shaft having a single slot and a pair of slots, of spring pressed opposed impaling jaws adapted to be guided by the latter slots, and means pivotally mounted in the first mentioned slot for releasing the jaws.

2. In an animal trap, the combination with a shaft having a single slot and a pair of slots right angularly disposed to the former slot, of opposed spring pressed impaling jaws having radiating intermeshing barbed terminals and adapted to be guided by the latter slots, and means pivotally mounted in the first mentioned slot for releasing the jaws.

3. In an animal trap, the combination with a shaft having a single slot and a pair of slots, of opposed spring pressed impaling jaws having radiating intermeshing barbed terminals and adapted to be guided by the latter slots, and a trigger and tripper mechanism mounted within the other slot for simultaneously releasing the jaws.

4. In an animal trap, the combination with a shaft having a single slot and a pair of slots therein, of opposed spring pressed impaling jaws adapted to be guided by the latter slots, a trigger arranged medially of the other slot, trippers positioned adjacent the terminals of the latter slots designed to engage said trigger and said jaws, and a bait holding device connected to the trigger.

5. In an animal trap, the combination with a shaft having a single slot and a pair of slots, of opposed spring pressed impaling jaws adapted to be guided by the latter slots, a trigger pivoted medially of the other slot and having diagonally disposed projections, trippers pivotally mounted adjacent the terminals of the first mentioned slot and having shoulders for engagement with the respective jaws and terminally reduced portions for engagement with the projections on said trigger, and a bait holding device connected to the trigger.

6. In an animal trap, the combination with a shaft having sleeves terminally disposed thereon, a pair of reciprocally movable impaling jaws carried by said shaft, said jaws and said sleeves having oppositely arranged annular recesses, and springs adapted to encircle the shaft intermediate the jaws and the sleeves, the said recesses serving as seats for said springs.

7. In a trap, the combination with a shaft, bodily-movable spring-pressed jaws carried by said shaft, of a pivotally-mounted trigger interposed between said jaws, means engaging the trigger at opposite sides of its pivoted point and adapted to secure the jaws in a set position, means coöperating with said trigger whereby the same may be sprung for releasing the jaws.

8. In a trap, the combination with a shaft, of bodily-movable slidable jaws mounted upon and surrounding said shaft, a trigger supported entirely by and movably mounted upon said shaft between said jaws, trippers movably mounted upon said shaft at opposite sides of the trigger adapted to engage the jaws and also engage the trigger at opposite sides thereof, for retaining the jaws in a set position, means coöperating with the trigger for springing the same after it has been set and thereby releasing the jaws, and means for forcing the jaws together.

9. In a trap, the combination with a shaft, of bodily-movable spring-pressed jaws slidably mounted upon and surrounding said shaft, trippers pivoted to the shaft engaging the jaws and holding the same in a set position, a trigger mechanism interposed between the jaws and adapted to engage and secure the trippers in a set position.

10. In a trap, the combination with a supporting member, of slidably-movable jaws carried by said supporting member, laterally-movable trippers carried by said supporting members and adapted to engage and hold the jaws in a set position, and a trigger mechanism interposed between the jaws and being capable of holding the trippers in a laterally-extended position upon the supporting member for securing the jaws in their set position.

11. In a trap of the class described, the combination with a supporting member, of bodily-movable sliding jaws carried by said supporting-member, a trigger mechanism interposed between said jaws and mounted upon said supporting member, tripper-means carried by said supporting-member and engaging said jaws and trigger mechanism whereby when the trigger mechanism is set the jaws will be retained in a set position and when the trigger is sprung said tripper means will move inwardly upon the supporting-member and allow the jaws to close together, and means for forcing the jaws together.

12. In an animal trap, the combination with a supporting-member, of bodily-movable jaws carried by said supporting-member, means for closing said jaws together, a trigger interposed between said jaws and pivotally mounted upon the supporting-member, said trigger provided with tripper-holding means, trippers pivotally mounted upon the supporting member at opposite sides of the trigger and being capable of retaining the jaws in a set position, said trippers engaging the tripper-holding means of the trigger when in a set position, and means for springing said trigger and allowing the trigger and the trippers to close upon the supporting member and the jaws to close together over the trippers and the trigger.

13. In an animal trap, the combination with a supporting-member, of slidable jaws carried by said supporting-member, trippers interposed between said jaws and carried by the supporting member and being adapted to hold the jaws in a set position, a trigger mechanism carried by the supporting-member and interposed between the jaws and being adapted to hold the trippers in a set position, means for springing said trigger, and means for forcing said jaws together over the trippers and the trigger.

In testimony whereof I hereunto affix my signature in presence of two witnesses.

JOHN H. WILSON.

Witnesses:
H. H. CLARK,
ALBERT HUBER.